April 7, 1970  R. T. MARSHALL  3,504,527
APPARATUS FOR MEASURING THE MOISTURE VAPOR
PERMEABILITY OF A SAMPLE SHEET MATERIAL
Filed June 20, 1968  2 Sheets-Sheet 2
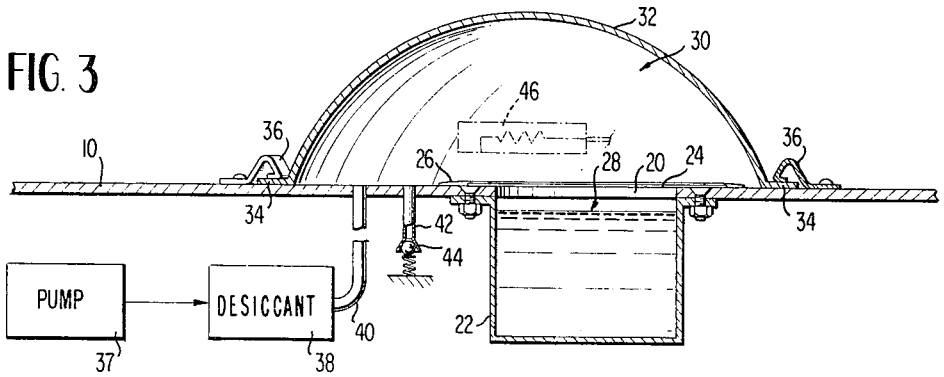
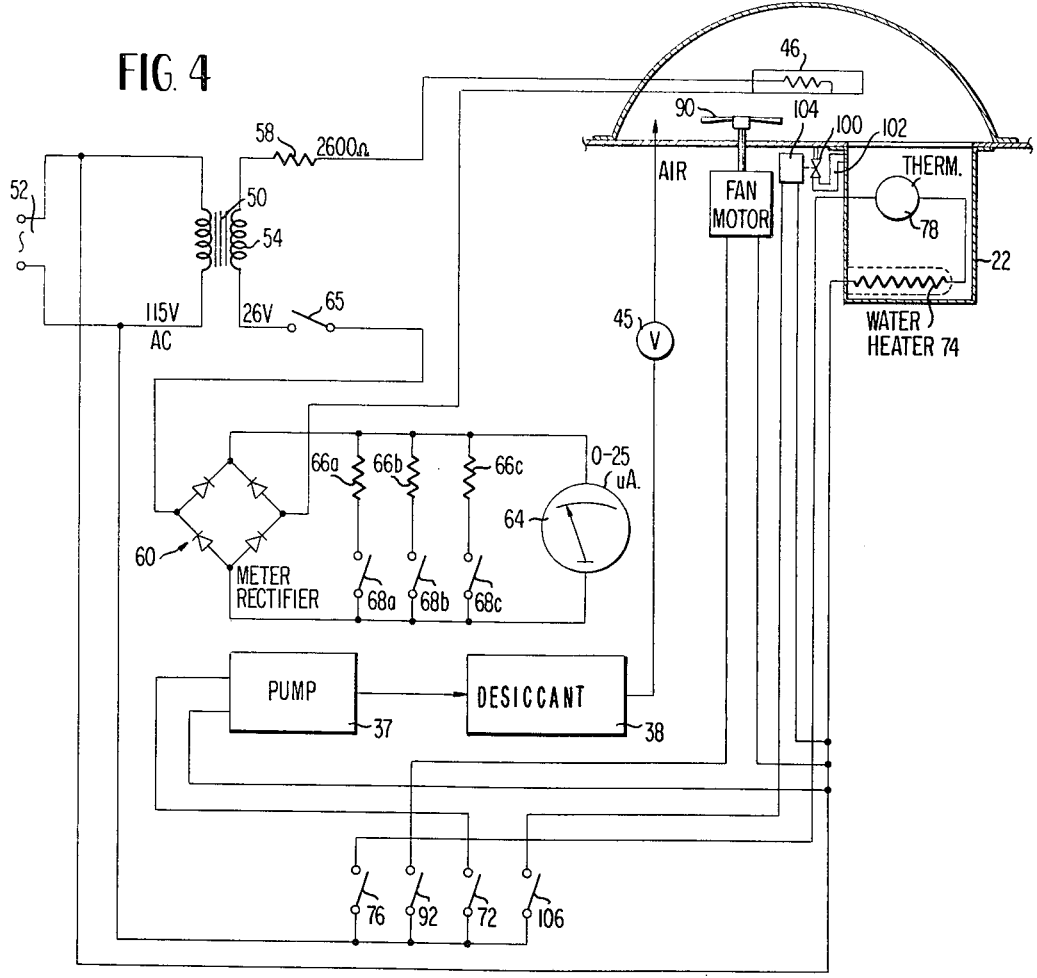

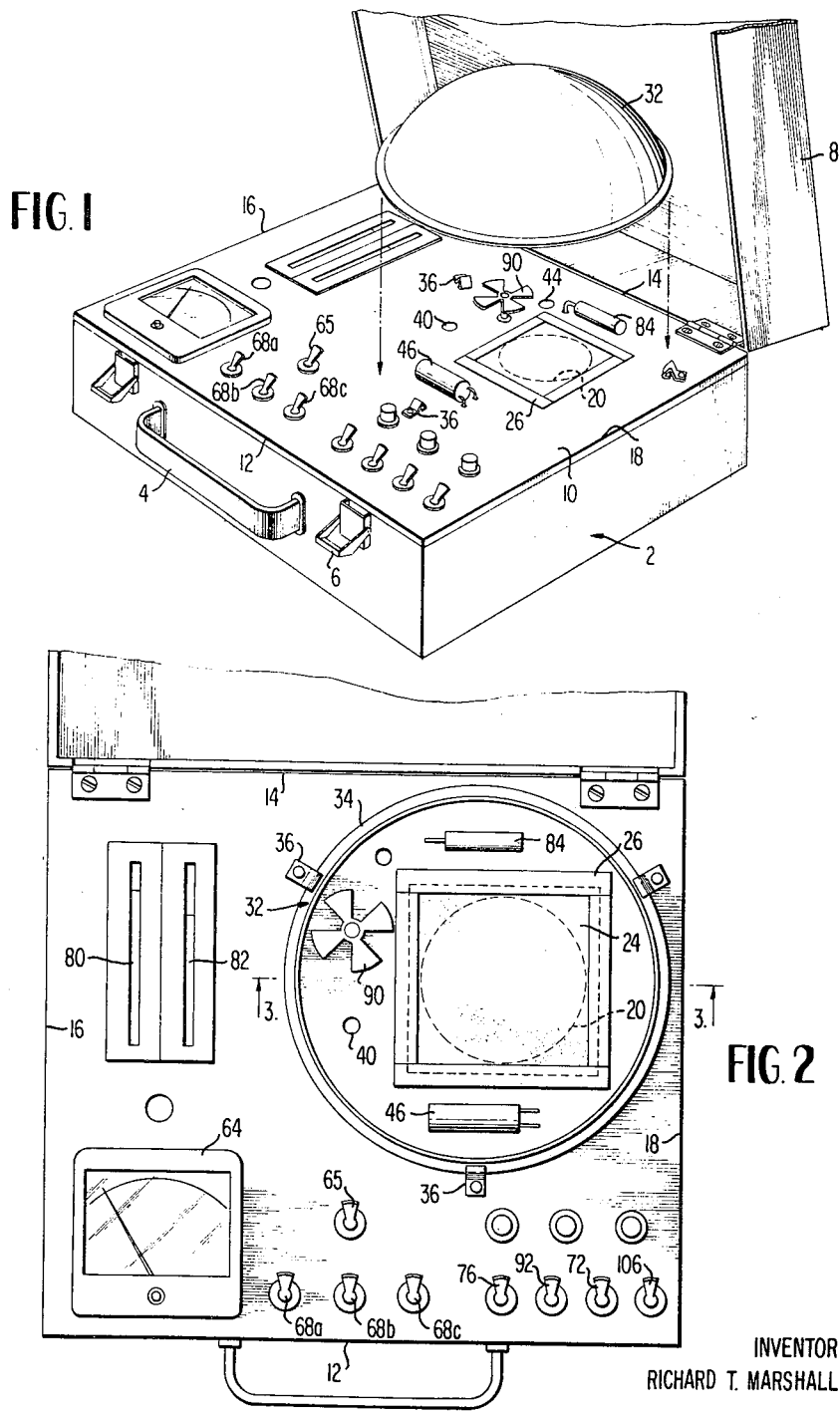

United States Patent Office 3,504,527
Patented Apr. 7, 1970

3,504,527
APPARATUS FOR MEASURING THE MOISTURE VAPOR PERMEABILITY OF A SAMPLE SHEET MATERIAL
Richard T. Marshall, Englishtown, N.J., assignor to Thiele-Engdahl, Elizabeth, N.J., a corporation of New Jersey
Filed June 20, 1968, Ser. No. 738,661
Int. Cl. G01n 15/08
U.S. Cl. 73—38                           5 Claims

ABSTRACT OF THE DISCLOSURE

A system intended to measure the moisture vapor permeability of a sample of sheet material. This system includes a testing unit having an interior chamber provided with a moisture responsive electrical sensor of varying impedance. The sample of sheet material is secured across the chamber to divide it into noncommunicating first and second subchambers with the second subchamber enclosing the sensor. Moisture vapor saturated air is supplied continuously to the first subchamber. At an initial starting time a quantity of dry air filling the second subchamber is entrapped therein. Alternating current is applied to the sensor to provide an A.C. output signal proportional to the impedance of the detector. The A.C. signal is rectified to D.C. and applied to a D.C. meter to provide a reading. The change in reading observed during a predetermined time interval provides a measure of the amount of moisture vapor permeated through the sample within the predetermined interval.

BACKGROUND OF INVENTION

This invention relates to a method and apparatus for testing the moisture permeability of sheet material and in particular for testing the moisture permeability of coated sheet packaging materials.

In packaging certain kinds of perishable goods to retard deterioration, such as for example bread, it is often advantageous for economic reasons to utilize low cost packaging materials such as waxed or lacquered paper. Commonly, the manufacture of packaging materials of this type involves the application to paper-like materials, of a coating having a high degree of water vapor impermeability. Application of the coating must, however, be very accurately controlled to provide the optimum compromise between low material cost and satisfactory water vapor impermeability characteristics.

Such accurate control of the coating process usually requires periodic testing of samples of the material being produced for satisfactory impermeability. For this purpose, certain prior devices for testing the moisture permeability of packaging materials have been developed.

At least one such prior device includes a chamber across which a sample of material to be tested is sealingly secured to divide the chamber into noncommunicating first and second subchambers. Very moist air is continuously applied to one of the subchambers with an initial supply of dry air being entrapped in the other of the subchambers. As moisture vapor permeates from the moist to the dry chamber through the sample, the rise in humidity in the dry chamber changes the resistance of a moisture responsive electrical sensor extending into the dry chamber.

Prior systems of the type described may, however, sometimes prove unsatisfactory for a number of reasons. For example, it has been common in such prior testers to apply a full mains A.C. voltage across the moisture sensitive resistor. As the resistor must usually be placed in an exposed position if it is to perform its function of measuring the moisture vapor, there has been a serious electrical safety hazard to operating personnel arising from inadvertent physical contact with the resistor. It has not, however, been considered practicable to step down the A.C. voltage to a lower level at which any shocks would be harmless, because this would bring the corresponding A.C. output signal current down to a level below that for which reliable A.C. ammeters can be developed.

In addition, the prior system described derives an alternating current output from the sensor which is fed into a reading and computing installation involving the provision of complex amplifying and other electrical circuitry. The necessity for a complex installation of this type may render such prior testing apparatus unnecessarily expensive.

Also, the need for a complex computing installation has often prevented such prior testers being sufficiently portable for manual carrying from location to location as may be required, for example, in a plant provided with several coating machines whose separate outputs are to be periodically tested Other problems have arisen in that the air in the dry chamber has sometimes been able to form stagnant zones within the chamber with the result that the moisture responsive sensor has sensed a level of humidity not representative of the total humidity within the dry chamber. In such an event, an inaccurate indication of the degree of moisture permeated through the sample may be obtained.

SUMMARY OF INVENTION

It is therefore a general object of the invention to provide a method and apparatus for testing the moisture vapor permeability of sheet materials, which obviates or minimizes the problems of the type previously noted.

It is a particular object of the invention to provide a method and apparatus for testing the moisture vapor permeability of sheet material in which an indication of permeability may be obtained without the necessity for complex electrical circuitry.

It is a further object of the invention to provide an apparatus for measuring the moisture vapor permeability of sheet material which is sufficiently portable to be easily moved by one person from one location to another, as desired.

It is yet another object of the invention to provide an apparatus for measuring the moisture vapor permeability of a sample of sheet material of the type described utilizing a dry air chamber, wherein the possibility of an inaccurate indication of permeability due to the development of stagnant air zones within the dry air chamber is obviated or minimized.

An apparatus for measuring the moisture vapor permeability of a sample of sheet material according to a preferred embodiment of the invention includes a housing provided with a longitudinally extending, enclosed chamber. The sample is releasably secured across the interior chamber by mounting means to cause the sample to divide the chamber into first and second, noncommunicating subchambers. Moisture supplying means connected with the housing supplies moisture vapor saturated air continuously to the first subchamber. Dry air means entraps a quantity of dry air in the second subchamber at an initial time. A moisture responsive electrical sensor connected with the housing extending into the second subchamber has an electrical impedance varying in proportion to the humidity of the air surrounding the sensor. Alternating current electrical circuit means is connected with the sensor for producing an alternating current output signal dependent upon the magnitude of the impedance of the sensor. Rectifier means connected with the sensor means rectifies the alternating current output signal into a direct current output signal which is fed to indicator means producing an indication responsive to the magnitude of the D.C. output signal. In operation, the magnitude of the output signal at the initial time is compared with the magnitude of the output signal after a subsequent time interval of predetermined length.

The change in output over the predetermined time interval is compared with the change in output over an equal time interval for a standard sample of known permeability to provide an indication of the relative permeability of the sample being tested.

THE DRAWINGS

An apparatus for measuring the moisture vapor permeability of a sample of sheet material, constructed in accordance with one preferred embodiment of the invention, is shown in the accompanying drawings in which:

FIGURE 1 is a perspective view of a portion of an apparatus for measuring the moisure vapor permeability of a sample of sheet material according to one preferred embodiment of the invention;

FIGURE 2 is a plan view of the apparatus shown in FIGURE 1 with a dome forming a part of the apparatus partially broken away for clarity;

FIGURE 3 is a cross-sectional side view of a portion of the apparatus shown in FIGURE 2 taken along the lines 3—3 therein; and FIGURE 4 is a schematic view of an electrical circuit forming a part of the apparatus shown in FIGURE 1.

DETAILED DESCRIPTION

Referring to FIGURE 1 of the drawings, an apparatus for measuring the moisture vapor permeability of a sample of sheet material, constructed in accordance with a preferred embodiment of the invention, is there shown. The apparatus includes a rigid rectangular carrying case 2 provided with a handle 4, clasps 6, and a lid 8 hinged to the case. An upper, generally horizontal, flat surface 10 (FIGURE 2) of the carrying case 2 includes forward and rear edges 12 and 14, respectively, and left and right side edges 16 and 18 respectively.

Adjacent the rear right hand corner of the flat surface 10 is a circular opening 20. A cylindrical container 22 (FIGURE 3) is fixedly secured to the underside of the flat surface 10 extending about the opening 20. The container 22 has a closed lower end and is filled with water to a level spaced below the adjacent underside of the flat surface 10. A rectangular sample 24 of sheet material to be tested is disposed in overlapping relation to the opening 20 and fixedly secured to the upper side of the surface 10 by a gasketed frame or mask 26 which is used to clamp the sample about its edges in sealing relation to surface 10.

The space between the underside of the sample 24 and the surface of the water in the container 22 constitutes a first subchamber 28. As will be described, the water in the container 22 is heated so that the air within the first subchamber 28 is saturated with water vapor during performance of each test.

A dry atmosphere is provided on the upper side of the sample 24 within a second subchamber 30 defined by a dome 32. The dome 32 is rigid, hemispherically dished cover provided with an outwardly directed, horizontal flange 34 extending about the lower peripheral edge of the cover. The dome 32 is detachably secured to the flat upper surface 10 of the carrying case by releasable spring snap connectors 36 overlapping the flange 34 to press it sealingly against the surface 10. The connectors 36 are secured to the surface 10 and spaced equally about the dome. Alternatively, subchamber 30 may be defined by a rectangular box-like lid, hinged at the back and using a single clamp at the front.

Air to fill the second subchamber 30 is drawn in from the atmosphere by an electrically powered pump 36 which passes the air through a desiccant contained in a container 38. The desiccant in the container 38, which may for example be calcium chloride, dries out any water vapor present in the atmospheric air drawn in by the pump 36 and passes the dried air through an inlet pipe 40 into the second subchamber 30. The air is pumped into and through the second subchamber 30 for a reasonable length of time to drive any existing moist air therein outwardly through an outlet pipe 42. The outlet pipe 42 is controlled by a check valve 44 permitting flow in one direction only from the second subchamber 30 out to atmosphere. After an adequate period of time to permit all the previous air in the second chamber 30 to be replaced by dry air, operation of the pump is terminated. Reverse air flow out through the inlet line 40 is prevented by a check valve 45 (FIGURE 4) interposed in the inlet line so that the second chamber 30 is thus filled with an entrapped quantity of dry air at an initial starting time.

Thereafter, as moisture vapor permeates from the moist first subchamber to the dry second subchamber through the sample 24, the humidity of the dry air in the second subchamber 30 commences to increase. This increase in humidity alters the electrical impedance of a moisture responsive electrical resistor 46 positioned within the second chamber.

The moisture responsive resistor 46 forms one circuit element of an electrical circuit shown in more detail in FIGURE 4. The circuit there shown includes a transformer 50 having its primary windings connected to a conventional source 52 of alternating current such as, for example, the electrical mains. A suitable plug in connection to the mains may be provided on the carrying case 2. The secondary winding 54 of the transformer is arranged in a suitable step-down ratio to the primary windings to provide a considerably lower operating voltage for the measuring circuit.

In an important aspect of the invention, the step-down ratio is suitably chosen to ensure that the voltage developed across the secondary windings is sufficiently low not to produce dangerous electrical shocks to any person accidentally touching the resistor while it is live. The step-down ratio of the primary to the secondary windings of the transformer 50 in the preferred embodiment is such as to step down a mains input voltage of 115 v. to a voltage across the secondary winding 24 of 26 v. However, it may be appreciated that other step down ratios can be provided.

One side of the secondary winding 54 of the transformer is connected through a trimming resistor 58 in series with the previously mentioned humidity responsive resistor 46, to one side of a conventional full wave rectifier bridge 60. The other side of the secondary windings is connected to the other side of the rectifier bridge 60.

One result of the step down in voltage provided for safety reasons (as discussed above) is that the current through the resistor 46 is only of a very low order. For example, in the preferred embodiment, the current may be less than 25 ma. As accurate alternating current meters responsive to such low levels of current are not generally available in commerce, the rectifier bridge 60 enables the utilization of an accurate D.C. meter 64 responsive to such low currents, such D.C. meters being readily available. Additionally, it has been found that the rectifier provides a stabilizing effect smoothing out random fluctuations in signal level and providing a rapidly responsive, but not flickering, needle movement on the meter. To enable the meter to be completely disconnected from circuit when its use is not required, an on-off switch 65 is interposed between the rectifier bridge 60 and one side of the secondary windings 54 of the transformer 50.

It will be appreciated that as the resistance of the moisture responsive resistor 46 changes, this causes a corresponding change in the alternating current potential applied across the full wave rectifier bridge 60.

The rectifier bridge 60 produces a full wave rectified, direct current output which is applied to the conventional direct current ammeter 64. The ammeter 64 may be suitably calibrated so that when there is a nearly dry atmosphere in the second chamber 30, a zero reading is shown on the ammeter 64.

In performing the test, the dome 32 is removed and a sample of the material to be tested is taped over the opening 20. The dome is then replaced and dry air is passed through the subchamber 30 to purge out any existing atmospheric air and fill the chamber with dry air so that when the pump is turned off at the initial time to start the test there will be an initially nearly dry atmosphere in the second chamber 30. At this time, the meter 64 has a zero reading. As moisture vapor permeates through the sample 24 causing the humidity of the air in the second chamber to increase, the resistance of the moisture responsive resistor 46 changes. This causes the rectified direct current potential developed across the bridge 60 to change from its initial value at which the meter was calibrated for a zero reading, with the result that the ammeter 64 provides a different reading. The change in reading over the predetermined time interval from the commencement of the test is compared with the corresponding change in reading obtained utilizing a standard sample of permeability characteristics known to be satisfactory. Thus, the ratios of the two readings provide a measure of the relative permeability of any particular sample to the standard sample of known permeability and suitable ranges of variation from the standard within which acceptable characteristics are provided may be established.

As samples of widely varying permeability characteristics may need to be tested, the meter 64 is provided with a plurality of alternatively connectable, parallel shunts 66a, 66b and 66c which may be selectively switched in and out by switches 66a, 66b and 66c. In this way, the meter sensitivity may be suitably adjusted to obtain the largest range of meter deflection available, for samples of greatly differing moisture vapor permeability.

The electrical circuitry shown in FIGURE 4 also includes an electrical power circuit from the previously mentioned A.C. input 52 through an on-off switch 72 to the previously mentioned electrical pump 36. After the pump switch 72 has been placed in an on condition to energize the pump 36 for a sufficient period to purge any previous moist air from the second chamber 30, placing of the switch 72 into the off position provides the starting time at which the predetermined interval for conducting the test commences.

Also included in the electrical circuitry is a power circuit from the input 52 to an electrical immersion heater 74 immersed in the water in the container 22. In series in the power circuit to the water heater 74 are an on-off switch 76 and a thermostat 78. The thermostat is of any conventional kind and may be set to regulate the temperature in the water to a predetermined temperature so that the first subchamber 28 may be filled with air of predetermined absolute humidity.

The temperature in the water may be read by a thermometer 80 positioned on the front face 10 of the case (FIGURE 2) having a temperature responsive sensor (not shown) communicating with the water in the container 22. Similarly, the air temperature in the first chamber 30 may be read by another thermometer 82 connected with a temperature responsive element 84 mounted on the flat surface 10 within the second chamber 30.

In order to prevent the development of stagnant zones within the air space of the second chamber 30 which might otherwise cause the resistor 46 to develop an output not truly representative of the average level of humidity within the second chamber, an electric motor driven fan 90 (FIGURES 2 and 4) is provided. The fan 90 turns at enough speed to keep the air within the second chamber 30 sufficiently mixed to avoid the development of stagnant zones. A fan on-off switch 92 is interposed in an electrical supply circuit from the supply 52 to the fan motor.

In certain alternative modes of operation of the testing unit, it is envisioned that the aperture 20 may be blanked off completely by an impermeable sealing plate such as for example a metal plate. In one such alternative mode of operation, a sample of freshly wrapped goods would be placed in the chamber 30 and the chamber 30 would be purged and filled with dry air in the manner previously described. As moisture from the goods permeated through the wrapping material, the humidity of the chamber 30 would rise over a predetermined time interval and the rise could be measured in a manner similar to that already discussed.

In the second alternative method of operation utilizing a sealing plate over the opening 20, a freshly wrapped sample of goods would be placed in the air chamber 30 which would then be filled with moisture vapor saturated air. This filling of saturated air is effected by opening of a valve 100 interposed in a conduit 102 directly connecting the first and second subchambers. Opening and closing of the valve 100 is effected by an electrical solenoid 104 controlled by a valve open and close switch 106. The switch 106 is interposed in an electrical power circuit between the solenoid 104 and the previously mentioned electrical supply source 52. After the chamber 30 is filled with moist air, the valve 100 is closed and an initial reading of the meter 64 is observed. Thereafter, some proportion of the moisture in the air in the chamber 30 would pass inwardly through the wrapping to the goods within the sample, thus lowering the level of humidity in the chamber 30 to produce a drop in the reading of the meter 64. This drop, observed over a predetermined time interval affords a measure of the moisture vapor permeability of the wrapping about the sample and may be compared with the corresponding drop observed for a sample of the goods wrapped in a standard wrapping of satisfactory permeability.

SUMMARY OF ADVANTAGES

It will be appreciated that in following the method and apparatus of the present invention for the testing of the moisture vapor permeability of sheet materials, significant advantages are provided.

Very significantly, the combination of a stepdown transformer, rectifier, and D.C. meter provides the advantage of a safe voltage level across the resistor while still permitting an accurate moisture indication on a readily available type of meter.

In particular, the use of moist and dry subchambers with an alternating current output signal from a moisture responsive resistor in the dry chamber being rectified to provide a D.C. output connected to a D.C. meter provides a very inexpensive and rapidly acting system.

Additionally, the use of a simple rectified output connected to a D.C. meted obviates problems of complexity, unreliability, and increased cost associated with some earlier moisture vapor permeability testing apparatus (cf. U.S. Patent No. 3,286,509).

Significantly, the present apparatus is sufficiently noncomplex to permit the apparatus to be mounted in a carrying case which may readily be transplanted from location to location. Thus, it is particularly helpful in conducting tests where wrapping is being manufactured at several installations within one plant.

Other advantages are provided by the fan which avoids the possibility of the development of stagnant air zones within the dry chamber, thus ensuring that the moisture responsive sensor responds to the level of moisture vapor present in the second chamber as a whole.

Other advantages are provided by the several alternative shunts provided for the meter which enables the meter sensitivity to be adjusted to take account of materials of widely different permeability characteristics; and by the adjustable thermostat which enables the water to be heated so as to ensure a predetermined humidity level of the air within the first subchamber. Also noteworthy is the pump and desiccant system which provides for purging of air from the second subchamber and the filling of an initial quantity of dry air into the second chamber prior to conducting a test.

Although the invention has been described with reference to certain embodiments, it will be appreciated by those skilled in the art that numerous additions, deletions, substitutions, modifications and other changes not specifically described or disclosed may be made.

What is claimed is:

1. An apparatus for measuring the moisture vapor permeability of a sample of sheet material, the apparatus comprising a housing having
   a longitudinally extending, enclosed chamber,
   mounting means adapted to releasably mount the sample in sealing relation extending transversely across the interior of said chamber to divide said chamber into
      first and second, noncommunicating subchambers;
   remotely operable connecting valve means for selectively placing said first and second subchamber in direct fluid communication,
   moisture supplying means connected to said housing for supplying moisture vapor saturated air continuously to said first subchamber,
   dry air means for entrapping a quantity of dry air in said second subchamber at an initial time,
   a moisture vapor responsive electrical sensor connected with said housing extending into said second subchamber, said electrical sensor having an electrical impedance varying as a function of the humidity of the air surrounding said sensor.
   alternating current electrical circuit means connected with said sensor for producing an alternating current output signal dependent upon the magnitude of the impedance of said sensor,
   rectifier means connected with said sensor means for rectifying said alternating current output signal into a direct current output signal; and
   indicator means connected with said rectifier means for producing an indication responsive to the magnitude of the D.C. output signal.
   whereby a change in the output of said sensor occurring during a predetermined interval after said initial time may be observed.

2. An apparatus as defined in claim 1 wherein said alternating current means includes
   a means alternating current supply at relatively high voltage seriously injurious to human health in the event of shock,
   a stepdown transformer having a stepped down, alternating current output at a voltage level sufficiently low to present no serious health danger to a human being upon electrical shock, said stepped down output being applied to said sensor.

3. An apparatus as defined in claim 1 wherein said moisture supplying means further includes,
   a reservoir containing a supply of water, said reservoir at a point above the water level thereon communicating with said first subchamber,
   heating means connected with said reservoir for supplying heat to the water therein, and
   thermostat means connected with said heating means for controlling the temperature of the water.

4. An apparatus for measuring the moisture vapor permeability of a sample of sheet material, the apparatus comprising:
   a carrying case adapted to be carried by one person by hand, said case including a generally flat surface;
   a first subchamber having an opening intersecting said flat surface of said carrying case and extending substantially perpendicularly therefrom into said carrying case;
   mounting means adapted to releasably mount the sample in overlapping sealing contact extending entirely over said opening in said flat surface with edge portions of the sample being sealingly secured to adjacent portions of said flat surface of said carrying case;
   a dome adapted to be releasably and sealingly secured to said flat surface on a side thereof remote from said first subchamber over said opening, said dome when so secured and adjacent portions of said flat surface underlying said dome defining a second subchamber;
   moisture supplying means connected to said housing for supplying moisture vapor saturated air continuously to said first subchamber;
   dry air means for entrapping a quantity of dry air in said second subchamber at an initial time, said dry air means including pump means for drawing air from atmosphere, drying means connected with said pump means for receiving air therefrom, said drying means absorbing moisture from the air to dry the air, inlet means connected with said drying means and said second subchamber for conducting dry air from said drying means into said second chamber, and check valve means connected with said second subchamber and with the atmosphere for permitting flow of air from said second chamber to the atmosphere in an outward direction only,
   a moisture vapor responsive electrical sensor connected with said housing extending into said second subchamber, said electrical sensor having an electrical impedance varying as a function of the humidity of the air surrounding said sensor;
   alternating current electrical circuit means connected with said sensor for producing an alternating current output signal dependent upon the magnitude of the impedance of said sensor;
   rectifier means connected with said sensor means for rectifying said alternating current output signal into a direct current output signal; and
   indicator means connected with said rectifier means for producing an indication responsive to the magnitude of the D.C. output signal,
   whereby a change in the output of said sensor occurring during a predetermined interval after said initial time may be observed.

5. An apparatus for measuring the moisture vapor permeability of a sample of sheet material, the apparatus comprising a housing containing:
   a longitudinally extending, enclosed chamber,
   mounting means adapted to releasably mount the sample in sealing relation extending transversely across the interior of said chamber to divide said chamber into first and second, noncommunicating subchambers;
   moisture supplying means connected to said chamber for supplying moisture vapor saturated air continuously to the first subchamber thereof;
   dry air means for entrapping a quantity of dry air in said second subchamber at an intial time, said dry air means including pump means for drawing air from atmosphere, drying means connected with said pump means for receiving air therefrom, said drying means absorbing moisture from the air to dry the air, inlet means connected with said drying means and said second subchamber for conducting dry air from said drying means into said second chamber, and check valve means connected with said second subchamber and with atmosphere for permitting flow of air from said second chamber to atmosphere in an outward direction only;
   a fan connected with said chamber extending into said second subchamber for imparting motion to the air therein to prevent the development of stagnant zones;
   a moisture vapor responsive electrical sensor connected with said chamber extending into said second subchamber, said electrical sensor having an electrical impedance varying as a function of the humidity of the air surrounding said sensor;

alternating current electrical circuit means connected with said sensor for producing an alternating current output signal dependent upon the magnitude of the impedance of said sensor;

rectifier means connected with said sensor means for rectifying said alternating current output signal into a direct current output signal; and indicator means connected with said rectifier means for producing an indication responsive to the magnitude of the D/C output signal, whereby a change in the output of said sensor occurring during a predetermined interval after said initial time may be observed.

References Cited

UNITED STATES PATENTS

| | | | |
|---|---|---|---|
| 3,073,149 | 1/1963 | Mongan | 73—38 |
| 3,286,509 | 11/1966 | Gluckman et al. | 73—38 |
| 3,412,786 | 11/1968 | Taylor | 73—38 XR |

LOUIS R. PRINCE, Primary Examiner

W. A. HENRY II, Assistant Examiner